Aug. 24, 1965   P. L. OSWEILER   3,201,843
CONCRETE PIPE MOLDING MACHINE
Filed Aug. 13, 1963   4 Sheets-Sheet 2
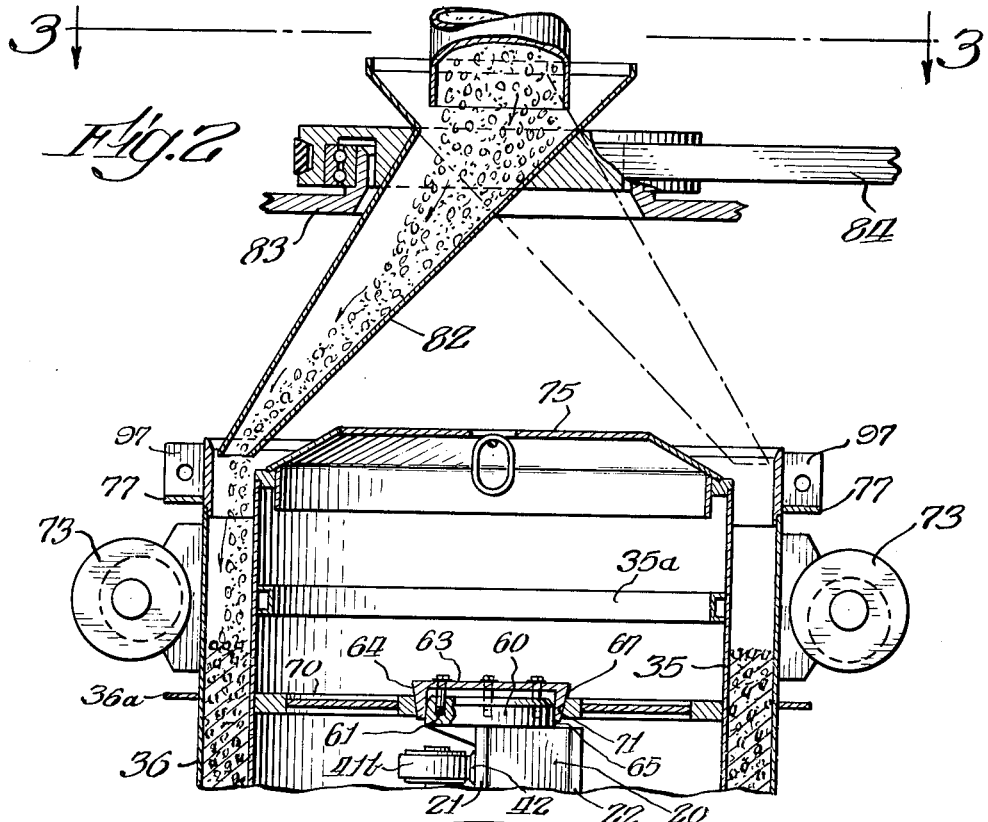
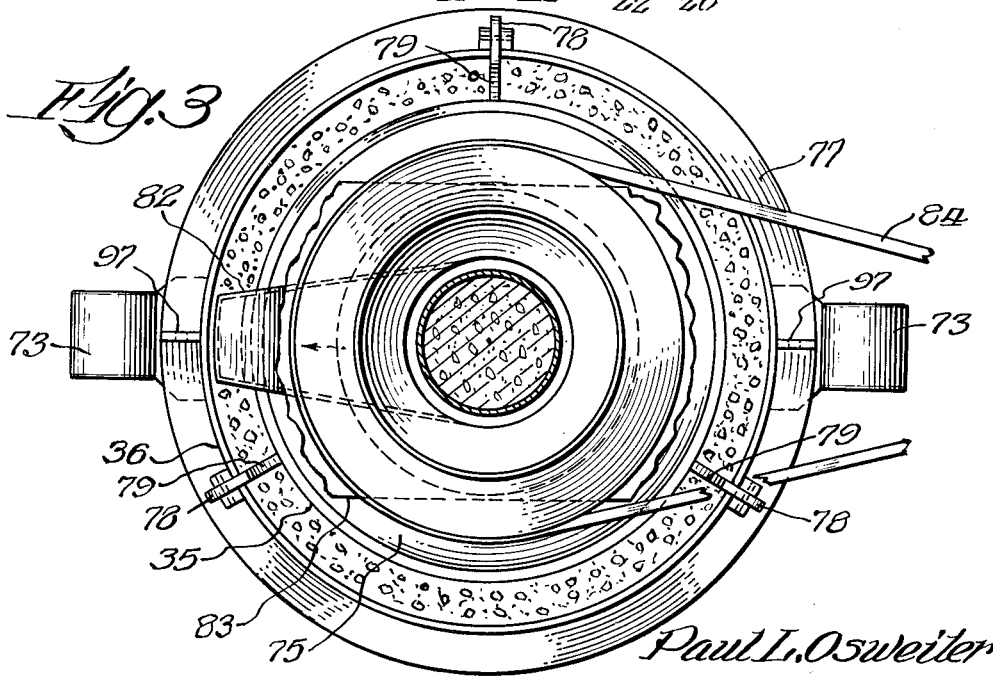
Paul L. Osweiler
BY Robert L. Kahn ATTY.

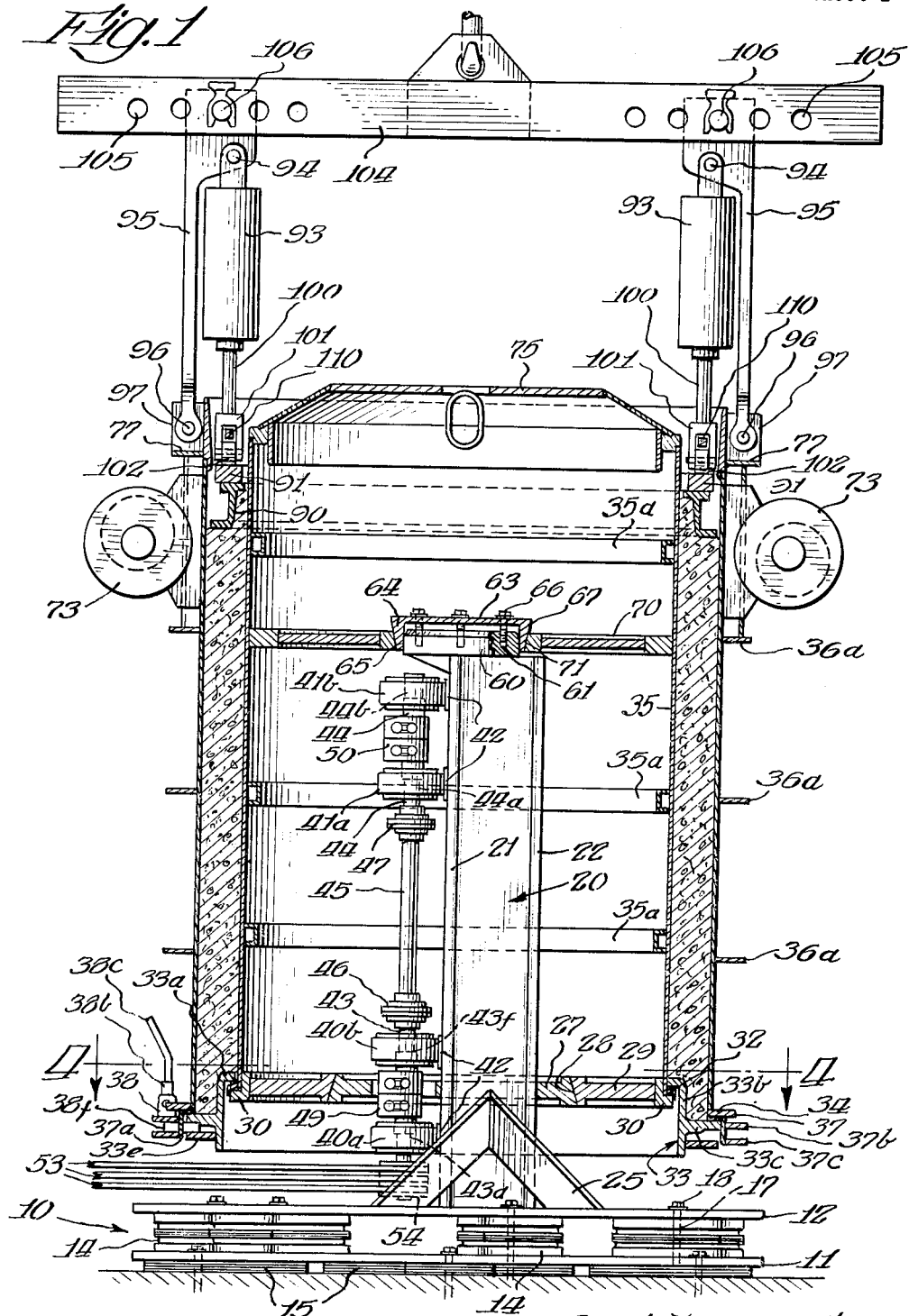

Aug. 24, 1965
P. L. OSWEILER
3,201,843
CONCRETE PIPE MOLDING MACHINE
Filed Aug. 13, 1963
4 Sheets-Sheet 3
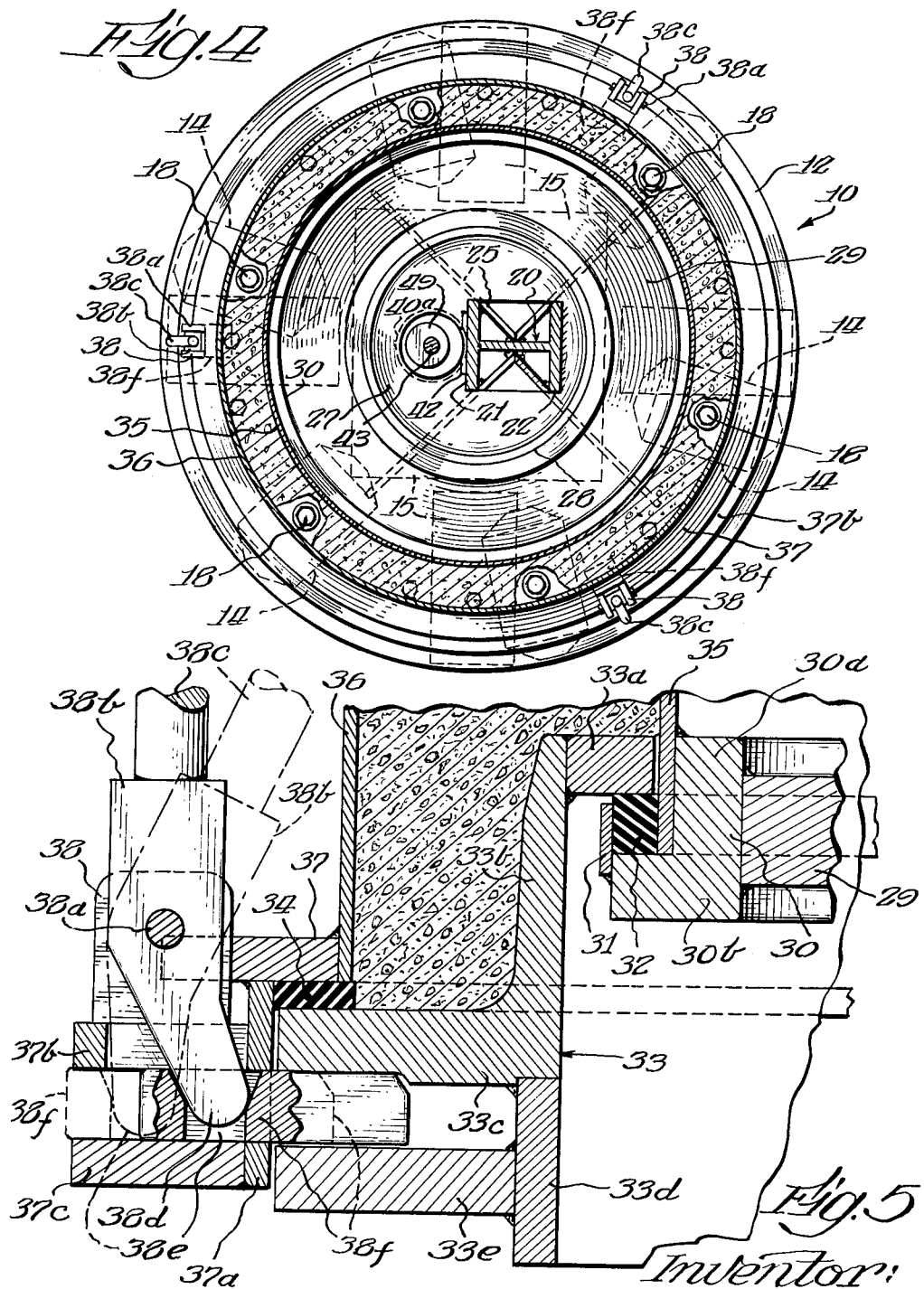
Inventor:
Paul L. Osweiler
BY Robert L. Kahn ATTY.

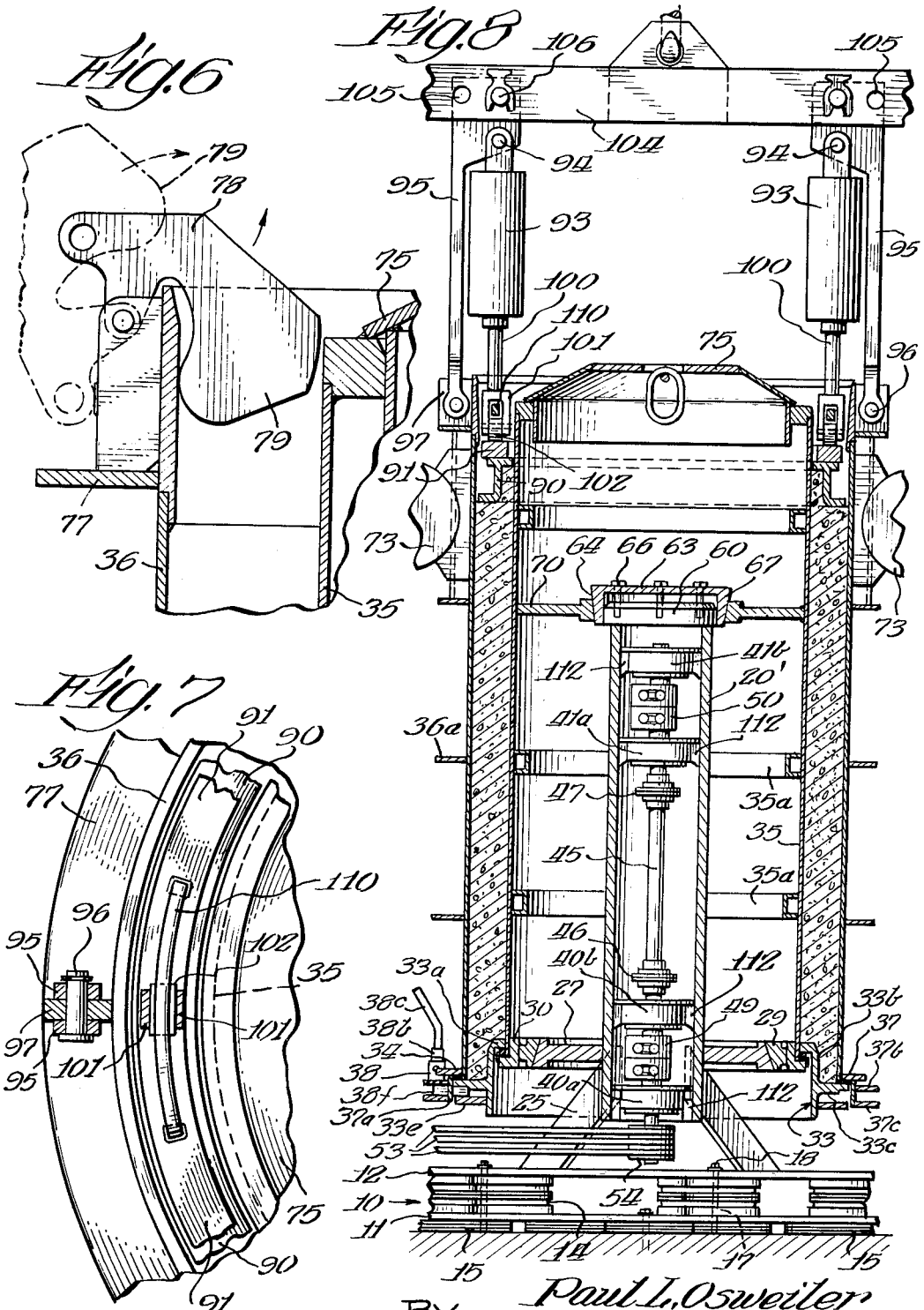

United States Patent Office 3,201,843
Patented Aug. 24, 1965

3,201,843
CONCRETE PIPE MOLDING MACHINE
Paul L. Osweiler, Dayton, Ohio, assignor to Price Brothers Company, Dayton, Ohio, a corporation of Michigan
Filed Aug. 13, 1963, Ser. No. 301,848
7 Claims. (Cl. 25—30)

This invention relates to a concrete pipe molding machine for molding "green" concrete pipe lengths in preparation for curing. The invention relates to a molding machine of the type wherein the pipe is molded about a vertical axis and is adaptable to pipe diameters of from about 24" to about 96".

A machine embodying the present invention has improvements in vibration generating means and also means for compacting the molding without the necessity for massive machine construction. In addition, a machine embodying the present invention has simple mechanism whereby the forms for molding may be readily changed for changing the diameter of pipe being worked upon.

Machines for molding concrete pipe are well known but suffer from serious drawbacks. For one thing, means for vibrating the mold, such means being built into the machine as distinguished from separate vibrators attached to the machine, have proven to be a fertile source of trouble. As a rule, the life of bearings and shafts in such machines has been unsatisfactory and has rendered the operation of such machines quite costly.

In addition, the necessity for compacting the mix along the direction of the pipe length has involved massive machine design. This problem of providing sufficient pressure and applying suitable vibration has made it difficult to use a "dry" mix of low or zero slump. In such a mixture, the water present is substantially the required proportion for the chemical interaction. It is understood that curing occurs in a steam room at about 150° F., this following conventional curing practice. As a rule, the dryer the mix, the greater the pressure and vibration required to compact the mix. Hence, prior machines have tended to use wet mixes because of the inability of the machine to compact the mix satisfactorily.

Since the same machine must be adaptable for various diameter pipes, it is desirable that the change from one pipe size to another be rendered possible with minimum delay and work. Due to the fact that such molding machines operate under conditions which are extremely adverse for the life of such machinery, simple and rugged design is of critical importance.

A machine embodying the present invention is characterized by simplicity of construction, ruggedness, ease of adaptability to different pipe sizes, long life to the vibrating part of the machine and inherent strength in the compressing portion of the machine.

The invention will now be disclosed in connection with the drawings wherein:

FIGURE 1 is an elevation, with certain parts in section, illustrating an embodiment of the invention, this figure illustrating the machine in position for compacting concrete mix to the mold region.

FIGURE 2 is a sectional detail of the top of the molding portion of the machine showing a chute for supplying concrete mix to the mold region.

FIGURE 3 is a top view along line 3—3 of FIGURE 2.

FIGURE 4 is a section along line 4—4 of FIGURE 1.

FIGURE 5 is an enlarged sectional detail at the bottom of the molding cylinders illustrating the relationship of the bottom pallet, gaskets and the means for locking the bottom of the outer molding cylinder to the bottom of the lower pallet.

FIGURE 6 is an enlarged detail illustrating the centering lugs at the top of the outer molding cylinder.

FIGURE 7 is an enlarged detail looking down on the pressing ring.

FIGURE 8 is an elevation of a preferred embodiment of the machine.

Referring to the drawings, the entire molding machine rests upon a generally circular vibration absorbing base 10 made of steel and shock absorbing material such as dense rubber. Base 10 may have any desired construction and , as illustrated here, has bottom plate 11 and top plate 12 of heavy steel disposed in vertically spaced relation by cushions 14 of dense rubber or other shock absorbing material. Lower base plate 11 rests upon cushions 15 of rubber. The two base plates are maintained in generally spaced relation by bolts 17 and nuts 18 which pass loosely through the base structure and allow limited movement of one base plate with respect to the other. As a rule, the amount of movement tolerated between the two plates making up the base may be of the order of about ¼".

The machine proper is carried by supporting column 20 which, in this instance, is an H beam having a web and sides 21 and 22. The bottom of H beam 20 is rigidly secured to top plate 12 as by welding and the H beam is further supported by legs 25 rigidly secured or welded to the H beam at a region above base plate 12 and also to base plate 12. The particular arrangement of the legs may be varied.

H beam 20 has rigidly secured thereto bottom cicrular support plate 27 at a region on the H beam which is disposed a short distance above top plate 12 of the base. Circular support plate 27 is rigidly welded to the H beam and is secured thereto in a sufficiently sturdy manner so that the entire weight of the molding machine can be carried thereby. Bottom support plate 27 has a circular outer surface 28 which is tapered so that the diameter increases from top to bottom of the plate. The degree of taper is not important.

Removably supported upon the tapered edge of bottom support plate 27 is bottom support ring 29 whose inner surface has a matching taper with that of support plate 27. Bottom support ring 29 (FIGURES 1 and 5) has peripheral portion 30 having upwardly extending flange portion 30a and outwardly extending flange portion 30b. Peripheral portion 30 is provided at the extreme outer surface thereof with retaining strip 31 which is welded to flange portion 30b and which cooperates with flange portion 30a to provide an annular well into which there is disposed gasket 32. Between gasket 32 and flange portion 30a lies the bottom edge portion of inner molding cylinder 35. The bottom portion of cylinder 35 is in intimate contact with flange portion 30a so that an all metal path for transmitting vibrations is provided.

Supported on the annular ledge provided by gasket 32 is bottom pallet portion 33a of a generally S-shaped bottom pallet 33 whose portions 33b and 33c are shaped so that the bottom end of the pipe can be molded. In this particular instance, pallet 33 is shaped to provide the bell end of a molded pipe. The various portions of the pallet structure may be welded together as, for example, 33a and 33b, the welding being illustrated by dark regions. Bottom pallet 33 also carries bottom flange 33d, which is here illustrated as being an extension of 33b and blocks 33e.

Covering the outer edge portion of bottom pallet portion 33c is rubber gasket 34 which supports the bottom edge portion of outer molding cylinder 36. Outer molding cylinder 36 carries at the bottom thereof at the outside reinforcing flange ring 37 which extends outwardly and which also has depending portion 37a which in turn has outwardly extending flanges 37b and 37c. This structure supports at spaced intervals around outer molding cylinder 36 (FIGURE 4) means for locking outer molding cylinder 36 to bottom pallet 33. The objective of this locking construction is to permit the elevation of the bottom pallet and outer molding cylinder, together with the molded pipe, upwardly while leaving inner molding cylinder 35 on the machine. After the molded pipe, pallet ring and outer molding cylinder are removed from the machine, the outer cylinder is unlocked from the bottom pallet ring and elevated to remove the outer cylinder from the molded pipe resting upon the bottom pallet ring.

The locking means may assume a variety of forms and is here illustrated as comprising clevis 38 having pin 38a upon which is secured bell crank 38b. Bell crank 38b has handle portion 38c and locking portion 38d. Locking portion 38d works in slot 38e of locking pin 38f which is adapted to slide in or out between flanges 37b and 37c carried by flange 37 which is carried by outer molding cylinder 36. Locking pin 38f slides between pallet portions 33c and 33e.

As is evident in FIGURE 5, moving handle 38c toward outer molding cylinder 36, as illustrated in dotted outline, will cause locking pin 38f to be moved outwardly so that the locking pin will not be below the bottom pallet.

Inner molding cylinder 35 is provided at various elevations with reinforcing channels 35a extending around and welded to the cylinder at the inside surface thereof. Similarly, outer molding cylinder 36 is provided with reinforcing flanges 36a at various elevations extending outwardly from the outer surface of the cylinder.

A vibration generating mechanism is provided laterally offset from H beam 20. This vibration mechanism includes bearings 40a, 40b, 41a and 41b rigidly supported along the H beam. As illustrated here, these bearings are supported along side 21 of the H beam by bearing plates 42 welded to the H beam. The bearings preferably are of the spherical roller type wherein barrel-shaped rollers work between concave races. Such bearings can stand the heavy loading.

As illustrated here, the bearing cooperates with portions of stub shafts 43 and 44 respectively. Stub shafts 43 and 44 are coupled to intermediate shaft portion 45 by conventional coupling devices 46 and 47.

Between lower bearings 40a and 40b there are rigidly bolted to stub shaft 43 eccentric weights 49. Similarly, eccentric weights 50 are rigidly secured to stub shaft 44 between bearings 41a and 41b. Care must be exercised to insure that weights 49 and 50 are equalized insofar as their effects are concerned, and are rotationally in phase. The alignment is such that when eccentric weight 49 tends to vibrate shaft 43 to the left, eccentric weight 50 will have the same effect in the same direction. The in-phase relationship is particularly important.

Bottom bearings 40a and 40b are disposed on opposite sides of bottom support plate 27 and eccentric weight 49 is disposed in a clearance opening in bottom plate 27. The vibration created in stub shaft 43 is transmitted to H beam 20 on opposite sides of bottom plate 27. Good vibration transmitting all metal paths between the eccentric weights and steel column are provided.

The vibrator means is driven from an electric motor, not shown, coupled by belts 53 to pulley 54 secured to the lower end of stub shaft 43.

Top bearing 41b is secured near the top of H beam 20. The top of H beam 20 is below the top edges of the casting cylinders 35 and 36 by about ¼ or ⅓ of the length of the casting cylinders. Molding cylinders 35 and 36 are about 8 feet in length. If the length is reduced, the top of H beam 20 can be near the top of the cylinder forms.

H beam 20 carries at the top rigidly secured thereto top plate 60 having a circular shape and provided with tapped recesses 61 disposed in a circular pattern. The center of top plate 60 must be coincident with the center of bottom plate 27 and the line of centers is preferably coincident with the axes of concentric casting form cylinders 35 and 36. Side 21 of H beam 20 is substantially coincident with the axis of the casting form cylinders.

Top plate 60 has associated therewith top adjustable wedging plate 63 having tapered peripheral portion 64 which is adapted to fit around the peripheral surface of top plate 60. Top plate 60 may have its outer peripheral surface 65 cylindrical or tapered. Top wedging plate 63 is suitably apertured to accommodate bolts 66 which can be threaded into tapped recesses 61. Top wedging plate 63 has its outer surface 67 tapered as shown in FIGURE 1 and is adapted to cooperate with top ring 70 whose inner surface 71 is tapered in the direction shown. Top ring 70 extends to the inner surface of inner molding cylinder 35 and is rigidly secured thereto as by welding. Both the top and bottom rings may be fabricated from spaced steel plates whose inner and outer edges are welded to solid steel rings. This construction provides strength and minimizes weight.

The arrangement of the top wedging plate insures that both the top and bottom tapered surface will be firmly gripped while eliminating the necessity for accurate matching of the top and bottom tapers. It is understood that the adjustable wedging ring may be used with the bottom plates in addition to or instead of the arrangement shown. In all cases, the wedging ring is bolted down to make all parts tight.

Secured to the outside of outer molding cylinder 36 at spaced intervals are auxiliary vibrators 73. These auxiliary vibrators are disposed above the top of the H beam and top plate assembly. Auxiliary vibrators 73 may be of any suitable type such as, for example, disclosed in United States Patent No. 2,875,988.

The interior of inner molding cylinder 35 is covered by cover 75 shaped to rest upon the top edge of inner cylinder 35. Outer molding cylinder 36 carries circumferential flange 77 near the top edge thereof. At spaced intervals along flange 77, spacing lugs 78 are pivotly supported. Lugs 78, as illustrated in FIGURE 6, can be moved so that the portion 79 of each lug can act as a spacer between the inner and outer molding cylinders. These lugs can also be moved out of the way to the dotted line position after the space between the molding cylinders is filled with mix.

When the molding region between the cylinders is to be filled with mix, chute 82 above the molding cylinders will supply mix to the space between the molding cylinders. Chute 82 is mounted for rotation in support 83. The chute and support for the chute are carried by a crane and at the proper time will be disposed above the molding cylinders as illustrated in FIGURE 2. The chute is rotatable about an axis which in the position illustrated in FIGURE 2 should be substantially coincident with the molding cylinder axes. Support 83 has a rotatable part which is driven by belt 84 so that chute 82 can move around and distribute the mix. The driving clutch for chute 82 is quite weak and the chute may be stopped in any desired position.

While mix is being poured into the region between the molding cylinders, all the vibrators are operating. When the region between the cylinders has been filled to the desired level, chute 82 and its support are moved away and the packing mechanism illustrated in FIGURE 1 is positioned. First, top pallet 90 is positioned above the mix. Top pallet 90 is of steel and is suitably shaped to provide the desired pipe end. As illustrated here, pallet ring 90 will provide a spigot shape for the top pipe end. Whatever the shape of pallet ring 90 will be, it will extend between the opposed cylinder surfaces and constitute the means for exerting pressure upon the mix. In this particular instance, auxiliary pressing ring 91 of heavy steel extends above pallet ring 90. The shape of auxiliary ring 91 and its dimensions are such that when ring 91 is forced downwardly as seen in FIGURE 1, pallet ring 90 will adjust to seal itself against the molding cylinder surfaces.

Force on ring 91 is provided by the following means. Air cylinder 93 is hung from pin 94 in tension member 95. Tension member 95 extends downwardly and the bottom is pivoted at 96 to lugs 97 rigidly secured to top flange 77. Air cylinder 93 has a piston therein which is connected to piston rod 100. Piston rod 100 terminates in fork or clevis 101 in which is supported roller 102 on a clevis pin. When air is supplied to cylinder 93, piston rod 100 will be moved downwardly so that roller 102 can press against ring 91. The reactive force due to the action of cylinder 93 will be taken up by tension member 95. Thus each air cylinder 93 will, in effect, push down ring 91 while pulling up on flange 77.

As illustrated in FIGURE 1, a pair of cylinders at diametrically opposed points are provided. Tension members 95 are suspended from crossbar 104 provided with a number of apertures 105 for accommodating pins 106. Pins 106 support the tension members from the crossbar and the aperture arrangement permits adjustment of the cylinder spacing for various pipe diameters. Instead of two cylinders 93, it is possible to have four cylinders or any desired number. Hydraulic cylinders may also be used.

It is understood that crossbar 104 will be supported by a crane. When the air cylinders are to be separated from the rest of the machine, pins 96 can be removed and the entire space above the molding cylinders can be clear.

It is desirable to keep ring 91 together with the air cylinder mechanism. Accordingly, ring 91 is provided with hooks 110 which are threaded through forks 101 above roller 102. When the air cylinder assembly is raised, heavy ring 91 will follow it. If desired, top pallet 90 may be secured to ring 91 so that the top pallet will also be removed with the air cylinders.

The operation of the entire machine is as follows.

The inner molding cylinder is kept in position on the machine so long as the pipe diameter is not changed. A bottom pallet and outer molding cylinder 36 are put into position and locked. The centering lugs illustrated in FIGURE 6 are adjusted to the position illustrated in solid lines. These centering lugs will clear chute 82. If a steel reinforcing cage for the concrete pipe is to be provided, this will be disposed in proper position between the molding cylinders. With the supply chute above the molding cylinders, mix is provided. The vibrators can be started after the molding region is partly filled and the vibrations will be continued to the end of the molding operation. After the space between the molding cylinders is filled to a desired level, the supply chute is removed and the air cylinder arrangement shown in FIGURE 1 is substituted.

The top pallet and pressing ring are disposed above the mix and with the vibrator still going, air in cylinder 93 causes the mix to be compressed. When this has been accomplished, the vibrators are stopped. The outer molding cylinder which had previously been locked by the pins to the bottom pallet is now raised together with the bottom pallet and molding. This is accomplished by raising cross arm 104 from which the air cylinders and tension members 95 depend. Then the outer molding cylinder, bottom pallet and molding are deposited on the floor at a different location from the machine. Thereafter, the bottom pallet is unlocked from the outer cylinder and the outer cylinder elevated with the entire air cylinder assembly to leave the bottom pallet and molding resting on the floor. Thereafter, a new bottom pallet is positioned and the outer molding cylinder is positioned above the bottom pallet. The bottom pallet and molding cylinder are locked by the pin arrangement. The air cylinder assembly, including the pressure ring and top pallet, are unlocked from the top of the outer cylinder and moved elsewhere. The supply chute is positioned as illustrated in FIGURE 2, it being understood that the tops of the molding cylinders are properly centered.

If desired, the top pallet ring can be left on the molding and a new pallet ring used.

The machine so far described provides a construction wherein the principal source of vibration is the supporting column for the machine. The vibration generator is laterally of the column. Such a disposition of parts makes it easy to get at the bearings for lubrication and replacement.

In FIGURE 8 a modification is illustrated wherein the supporting column consists of steel pipe 20' in which is supported the vibration generator. The various bearings are supported on inner wall portions 112 forming part of or rigidly secured to steel pipe 20'. As with the preferred embodiment, the bearings are preferably of the spherical roller type. The location of the bearings and eccentric weights along the coincident axes of the molding cylinders will be the same as in the machine previously described. It will be noted that the use of a hollow column, such as a steel pipe, permits of a symmetrical disposition of the column and vibrator shaft axis, in respect to the molding cylinders. However, the disposition of the bearings inside of a column makes it less convenient for inspection and repair. The machine illustrated in FIGURE 8 otherwise is the same as the machine illustrated in FIGURES 1 to 7 inclusive.

What is claimed is:

1. In a machine for molding concrete pipe, the combination of a supporting base, a steel column rigidly supported on said base and extending vertically in the normal operating position of the machine, vibration generating means including shaft means extending for substantially the length of said column, bearings for said shaft means, said bearings comprising two lower bearings and two upper bearings, means for rigidly securing said bearings to said column so that said shaft means extends vertically, said shaft means having rigidly attached thereto eccentric weights for generating vibration, said eccentric weights being disposed respectively between the lower two bearings and between the upper two bearings, said eccentric weights being in rotational alignment and having similar vibratory effects in phase, said shaft means having a drive pulley, lower inner cylinder support means secured to said column substantially at a region which is generally level with the lower eccentric weights and extending laterally from said coumn and terminating in an annular support area, a steel inner molding cylinder having its bottom edge on said annular support area with said inner molding cylinder extending vertically and disposed about said column and said vibration generating means, said lower cylinder support means providing an all metal path for transmitting vibratory energy from the vibration generating means to the lower edge of the inner molding cylinder, upper inner cylinder support means for securing the upper part of said column to the inside of the inner molding cylinder, a bottom pallet ring removably supported on said annular support area and providing an annular outer cylinder support area concentric with said inner cylinder, a gasket on said last named area, a steel outer molding cylinder having its bottom edge resting on said gasket, said two cylinders being concentric, manually controlled means for locking said outer cylinder and bottom pallet ring to be movable upwardly together, said machine including means for packing concrete mix in the space between molding cylinders and separate vibrators mounted externally of said outer cylinder near the top thereof.

2. The machine according to claim 1 wherein said upper and lower cylinder support means include cooperating tapered surfaces.

3. The construction according to claim 2 wherein at least one of said cylinder support means includes a circular plate having a wedge-shaped peripheral portion and includes means for tightening said plate so that the wedge-shaped portion is tightly disposed whereby the wedging action at the upper and lower plate support means are substantially independent of each other, thus eliminating extreme accuracy requirements.

4. The machine according to claim 1 wherein said column is in the shape of an H beam with the vibration generating means being secured along the beam side.

5. The machine according to claim 1 wherein said column is in the form of a cylinder with the vibration generating means disposed interiorly of said column.

6. In a machine for molding concrete pipe, the combination of a supporting base, a steel column rigidly supported on said base and extending vertically in the normal operating position of the machine, lower inner cylinder support means secured to said column extending laterally therefrom and terminating in an annular support area, said support means including two concentric cooperating portions having opposed tapered surfaces, one such portion carrying the annular support area, the other portion being within the one portion and being rigidly secured to said column, the tapered surfaces permitting the one portion to be moved upwardly only with respect to the other portion, a steel inner molding cylinder having its bottom edge on said annular support area with said inner molding cylinder extending vertically and disposed about said column, upper inner cylinder support means for rigidly securing said column to the inside of the inner molding cylinder, said upper cylinder end support means including two concentric cooperating portions having opposed tapered surfaces similar to the tapered portions of the lower cylinder support means, a bottom pallet ring removably supported on said annular support area and providing an annular outer cylinder support area concentric with said inner cylinder, a steel outer molding cylinder having its bottom edge supported on said last named area, said two cylinders being concentric, manually controlled means for locking said outer cylinder and bottom pallet ring to be movable upwardly together, and means for exerting force on top of the concrete mix in the space between molding cylinders, said force exerting means including a plurality of air cylinders, each air cylinder including a member relatively movable thereto in response to air pressure, each cylinder having a tension member having one end connected to the top part of said outer molding cylinder and having the other end connected to a relatively stationary part of the air cylinder, means for applying the relatively movable part of said cylinder to exert force on the mix near the top of the region between the molding cylinders, and means for removably supporting the top end of each tension member, said tension members and cylinders being adjustable as units for use with different cylinder diameters, said inner cylinder being free of the force exerting means whereby the inner cylinder always remains in the same position for each pipe making operation and is readily changed when the concrete pipe diameter is to be changed by elevating the inner cylinder.

7. The machine according to claim 6 wherein vibration generating means are rigidly secured to said column, said vibration generating means including shaft means and bearings of said shaft means, there being four separate bearings in pairs of two, and eccentric weights disposed on said shaft means between the bearings forming each pair, the eccentric weights being oriented and substantially equalized so that the vibrations due to the eccentric weights are substantially in phase.

References Cited by the Examiner
UNITED STATES PATENTS

| | | | |
|---|---|---|---|
| 2,356,852 | 8/44 | Hutchinson | 25—41 |
| 2,518,847 | 8/50 | Youngman | 25—131 |
| 2,544,453 | 3/51 | Gaudin | 25—41 |
| 2,585,756 | 2/52 | Eschenbrenner | 25—127 |
| 2,903,777 | 9/59 | Mitchell | 25—130 |
| 3,078,539 | 2/63 | Duplessis | 25—30 |
| 3,164,876 | 1/65 | Hendrix | 25—39 |

J. SPENCER OVERHOLSER, *Primary Examiner.*

MICHAEL V. BRINDISI, WILLIAM J. STEPHENSON,
*Examiners.*